US009669673B2

(12) United States Patent
Aalderink et al.

(10) Patent No.: US 9,669,673 B2
(45) Date of Patent: Jun. 6, 2017

(54) WHEEL AXLE SUSPENSION WITH RECTANGULAR AXLE BODY

(71) Applicant: VDL WEWELER B.V., Apeldoorn (NL)

(72) Inventors: Derk Geert Aalderink, Laren (NL); Marten Frank Ciarán Bruinja, Enschede (NL)

(73) Assignee: VDL WEWELER B.V., Apeldoorn (NL)

( * ) Notice: Subject to any disclaimer, the term of this patent is extended or adjusted under 35 U.S.C. 154(b) by 0 days.

(21) Appl. No.: 14/777,182

(22) PCT Filed: Mar. 11, 2014

(86) PCT No.: PCT/NL2014/050144
§ 371 (c)(1),
(2) Date: Sep. 15, 2015

(87) PCT Pub. No.: WO2014/142657
PCT Pub. Date: Sep. 18, 2014

(65) Prior Publication Data
US 2016/0031279 A1 Feb. 4, 2016

(30) Foreign Application Priority Data

Mar. 15, 2013 (NL) ...................................... 2010459
Mar. 15, 2013 (NL) ...................................... 2010460

(51) Int. Cl.
*B60G 11/113* (2006.01)
*B60G 7/00* (2006.01)
(Continued)

(52) U.S. Cl.
CPC .......... *B60G 11/113* (2013.01); *B60B 35/004* (2013.01); *B60B 35/006* (2013.01);
(Continued)

(58) Field of Classification Search
CPC ....... B60G 11/113; B60G 11/04; B60G 7/008; B60G 7/001; B60G 9/003; B60G 11/46;
(Continued)

(56) References Cited

U.S. PATENT DOCUMENTS 3,386,724 A * 6/1968 Chieger ................ B60G 11/113
267/52
3,547,215 A * 12/1970 Bird ....................... B60G 9/003
280/124.116
(Continued)

FOREIGN PATENT DOCUMENTS

AU 2009326657 A1 6/2011
DE 4224965 C1 8/1993
(Continued)

OTHER PUBLICATIONS

International Search Report—PCT/NL2014/050144—mailed Nov. 12, 2014.
(Continued)

*Primary Examiner* — Drew Brown
(74) *Attorney, Agent, or Firm* — Banner & Witcoff, Ltd.

(57) ABSTRACT

A wheel axle suspension of a vehicle, comprises an axle body having a rectangular cross section, a flexible trailing arm extending in a longitudinal direction of the vehicle and crossing the axle body substantially perpendicular, and at least one clamping strap assembly for clamping the axle body and the trailing arm together. The trailing arm has a front spring portion extending in the longitudinal direction of the vehicle and is provided with an axle seating portion adjoining the front spring portion at a rear end thereof. The axle seating portion comprises a longitudinal portion extending substantially in line with the front spring portion, and a downwardly extending portion extending substantially perpendicular to the longitudinal portion. The axle body is received in the axle seating portion with the upper side and rear side facing the longitudinal portion and the downwardly extending portion respectively. The axle seating portion of the trailing arm has an axle body facing surface having three engagement areas engaging the axle body respectively at the front upper corner, the rear upper corner and at a region at
(Continued)

or adjacent the lower rear corner of the axle body. Between said engagement areas there is a clearance between the axle body facing surface of the axle seating portion and the upper side and rear side of the axle body.

21 Claims, 5 Drawing Sheets

(51) Int. Cl.
  *B60G 9/00*   (2006.01)
  *B60G 11/46*  (2006.01)
  *B60B 35/08*  (2006.01)
  *B60B 35/00*  (2006.01)
  *B60B 35/02*  (2006.01)
  *B60G 11/04*  (2006.01)

(52) U.S. Cl.
  CPC .............. *B60B 35/02* (2013.01); *B60B 35/08* (2013.01); *B60G 7/001* (2013.01); *B60G 7/008* (2013.01); *B60G 9/003* (2013.01); *B60G 11/04* (2013.01); *B60G 11/46* (2013.01); *B60B 2900/311* (2013.01); *B60B 2900/325* (2013.01); *B60G 2200/13* (2013.01); *B60G 2200/31* (2013.01); *B60G 2204/148* (2013.01); *B60G 2204/4306* (2013.01); *B60G 2206/15* (2013.01); *B60G 2206/32* (2013.01); *B60G 2206/82* (2013.01); *B60G 2206/8207* (2013.01)

(58) Field of Classification Search
  CPC ............ B60G 2200/13; B60G 2206/15; B60B 35/006; B60B 35/004; B60B 35/02; B60B 35/08; B60B 2900/325
  See application file for complete search history.

(56) References Cited

U.S. PATENT DOCUMENTS

| | | | | |
|---|---|---|---|---|
| 3,707,298 A * | 12/1972 | Henry | .................... | B60G 9/003 267/256 |
| 4,705,294 A * | 11/1987 | Raidel | .................... | B60G 5/047 267/31 |
| 4,858,949 A * | 8/1989 | Wallace | .................... | B60G 7/04 280/124.116 |
| 5,328,159 A * | 7/1994 | Kaufman | .............. | B60G 11/113 267/52 |
| 6,032,967 A * | 3/2000 | Ogoniek | ................. | B60B 35/08 280/124.1 |
| 6,241,266 B1 * | 6/2001 | Smith | .................... | B60B 35/04 280/124.116 |
| 6,264,231 B1 * | 7/2001 | Scully | .................... | B60G 5/047 248/228.1 |
| 6,406,044 B1 * | 6/2002 | Wisotzky | ................. | B60G 9/00 280/124.1 |
| 6,508,482 B2 * | 1/2003 | Pierce | .................... | B60G 7/001 280/124.116 |
| 6,659,481 B2 * | 12/2003 | Auerbach | .............. | B60G 9/003 280/124.1 |
| 7,077,413 B2 * | 7/2006 | Svartz | .................... | B60G 9/003 280/124.164 |
| 2003/0209871 A1 * | 11/2003 | Melton | .................... | B60G 9/00 280/124.116 |

FOREIGN PATENT DOCUMENTS

| | | |
|---|---|---|
| DE | 29615286 U1 | 10/1996 |
| DE | 19946802 A1 | 4/2001 |
| DE | 102008061190 A1 | 6/2010 |
| DE | 102012207157 A1 | 10/2013 |
| EP | 1361085 A2 | 11/2003 |
| WO | 2012/078031 A1 | 6/2012 |
| WO | 2012/154032 A1 | 11/2012 |

OTHER PUBLICATIONS

Search Report and Written Opinion—NL2010459—dated Dec. 2013.

Search Report and Written Opinion—NL2010460—dated Dec. 2013.

* cited by examiner

WHEEL AXLE SUSPENSION WITH RECTANGULAR AXLE BODY

CROSS-REFERENCE TO RELATED APPLICATIONS

This application is a U.S. National Stage application under 35 U.S.C. §371 of International Application PCT/NL2014/050144 (published as WO 2014/0142657 A1), filed Mar. 11, 2014, which claims priority to Application NL 2010460, filed Mar. 15, 2013 and Application NL 2010459, filed Mar. 15, 2013. Benefit of the filing date of each of these prior applications is hereby claimed. Each of these prior applications is hereby incorporated by reference in its entirety.

BACKGROUND

The invention relates to a wheel axle suspension comprising:
- an axle body having a rectangular, preferably substantially square, cross section, having a front side, a rear side, an upper side and an underside, and having an upper front corner, an upper rear corner, a lower front corner and a lower rear corner,
- a flexible trailing arm extending in a longitudinal direction of the vehicle and crossing
the axle body substantially perpendicular, the trailing arm having a front spring portion extending in the longitudinal direction of the vehicle and provided with an eyelet formed at a front end and an axle seating portion adjoining the front spring portion at a rear end of the front spring portion, the axle seating portion comprising a longitudinal portion extending substantially in line with the front spring portion, and a downwardly extending portion adjoining the longitudinal portion at a rear end thereof, wherein the downwardly extending portion extends substantially perpendicular to the longitudinal portion, and wherein the axle body is received in the axle seating portion with the upper side and rear side facing the longitudinal portion and the downwardly extending portion respectively, and
- at least one clamping strap assembly for clamping the axle body and the trailing arm together.

Such a wheel axle suspension is known from DE 4224965. In the known wheel axle suspension the square axle body is clamped with its rear side onto the downwardly extending portion of the axle seating portion by means of generally U-shaped straps, a strap plate and nuts. The legs of the straps extend along the upper side and the underside of the axle body. The strap plate is arranged on a rear side of the downwardly extending portion an is provided with bores to receive the legs of the U-shaped straps.

SUMMARY

The invention has for an object to provide an improved wheel axle suspension of the type mentioned at the outset.

This object is achieved by a wheel axle suspension as discussed above, wherein the axle seating portion of the trailing arm has an axle body facing surface having three engagement areas engaging the axle body respectively at the front upper corner, the rear upper corner and at a region at or adjacent the lower rear corner of the axle body, and wherein in an untensioned state of the clamping straps between at least two of said engagement areas there is clearance between the axle body facing surface of the axle seating portion and the upper side and rear side of the axle body.

The three engagement areas in the axle facing surface provide three bearing points for the axle body and the axle body will always find a stable seating against the three bearing points independently of the exact shape and size of the rectangular axle body. Furthermore the rectangular axle body will be in general a thin-walled tubular axle body. The proposed three-point bearing of the axle body at the three engagement areas will be at the corners of the thin-walled axle body, which corners are the stiffer areas of the axle body. In this way the risk of an undesired deformation of the axle body when the clamping straps are tightened can be mitigated. In the tightened state of the clamping straps the clearance between the engagement areas may become smaller and may be even about 0.1 mm. In some occasions the clearance may even fully disappear when the straps are fully tightened.

The invention also relates to a trailing arm for such a wheel axle suspension.

Possibly at least one of the upper two of said engagement areas have a contact surface with a concave shape. The concave shape may be a continuously curved concave shape, but may also be a polygonal shape with flat or slightly curved surface segments.

Another possibility is that at least one of the upper two of said engagement areas has a substantially flat contact surface.

In a possible embodiment the upper rear engagement area is segmented in two substantially flat contact surfaces having a different inclination with respect to the longitudinal direction of the arm. The rectangular axle body has always rounded corners. The rounding will engage the mentioned two flat contact surfaces of the rear engagement area.

The lower rear engagement area possibly comprises a generally concavely shaped contact surface that engages the axle body just above the rear lower corner thereof. The concavely shaped contact surface at the lower rear engagement area assures a firm and stable support of the axle body, even if axle bodies with slightly differing dimensions or shapes are used.

In a possible embodiment of the suspension according to the invention the clamping strap has an upwardly extending leg that extends along the front side of the axle body and a rearwardly extending leg that extends along the underside of the axle body. The strap thus has generally a V-shape. Preferably the upwardly extending leg of the strap is supported at the front end of the axle seating portion of the trailing arm, and the rearwardly extending leg of the strap is supported at the rear end of the axle seating portion.

A strap plate may be provided at the front end of the axle seating portion of the trailing arm, which strap plate extends in transverse direction over an upper side of the trailing arm and has on either side a bore for an upwardly extending strap leg.

The downwardly extending portion of the axle seating portion of the trailing arm is at its lower end provided with a bore for a rearwardly extending leg of the strap.

Preferably, in the mounted state, the end portion of the rearwardly extending leg is bent upwards with respect of the remainder of the rearwardly extending leg that extends along the underside of the axle body. The bend is located at the lower rear corner of the axle body. By this the axle body is locked in the seating portion when the strap is tightened.

It is also possible that the end portion of the upwardly extending leg of the strap is bent rearwards with respect of the remainder of the upwardly extending leg that extends along the front side of the axle body.

In particular it is possible to make the end portions of the two non-parallel legs of the strap parallel to each other.

Preferably the end portion of the rearwardly extending leg of the strap is provided with a male thread, which cooperates with a nut for tightening the strap leg with respect to the trailing arm. Preferably, also the end portion of the upwardly extending leg of the strap is provided with a male thread, which cooperates with a nut for tightening the strap leg with respect to the trailing arm.

In a possible embodiment the strap plate has on either side a wing which is provided with the bore for the upwardly extending strap leg, and wherein the strap plate has a bridge portion that interconnects the wings of the strap plate.

In a further embodiment of the invention the trailing arm has in its upper side at the front of the axle seating portion at either side a recessed area, which recessed areas form a support surface for the wings of the strap plate. It is preferred that the strap plate is only supported at its wings and preferably the support surface of the recessed areas is located in a plane in which or near which the neutral axis of the trailing arm extends. When the trailing arm bends during normal use due to dynamic loads, the trailing arm will have no or hardly any displacement at its neutral line. By supporting the strap plate and thus the strap ends at or near the neutral line of the trailing arm, the straps do not have to move and the influence of the deformation of the trailing arm on the clamping construction will be minimised. According to this aspect the bridge portion of the strap plate does not make contact with the trailing arm.

Furthermore, the trailing arm between the two recessed areas may have a greater height (thickness) than the remainder of the trailing arm. This feature makes the trailing arm more rigid at the clamping region. This also reduces the transfer of dynamic loads into the clamping construction.

In a possible embodiment of the suspension according to the invention, the trailing arm furthermore comprises an air spring mounting portion that adjoins the axle seating portion at the lower end of the downwardly extending portion thereof, and that extends further rearwardly. In this embodiment the lower end of the downwardly extending portion has preferably an increased width with respect to the upper portion of the downwardly extending portion. This provides a wider and more stable basis to resist torsional loads imparted on the air spring mounting portion, for example by an air spring mounted in an offset position with respect to the longitudinal axis of the trailing arm.

In another embodiment, the support surface for each of the wings of the strap plate is located in a plane in which or near which the neutral axis of the trailing arm extends. When the trailing arm bends during normal use due to dynamic loads, the trailing arm will not have elongation (positive or negative) at its neutral line. By supporting the strap plate and thus the strap ends at or near the neutral line of the trailing arm, the straps will not be displaced and the influence of the deformation of the trailing arm on the clamping construction will be minimised. This aspect of the invention can be used with all kinds of trailing arm designs, e.g. trailing arms having a bended or curved axle seating portion bearing directly on an axle body, which may have a square or round (e.g. circular) cross section. However also on trailing arms with a substantially straight design, wherein the axle body is seated an axle pad located between the trailing arm and the axle body: this aspect of the invention can be applied.

The invention also relates to a trailing arm, Clamping strap, and an assembly of a trailing arm and a strap plate as described herein.

In the above, the three point bearing of the rectangular, preferably square, axle body is described for flexible trailing arms. It should be noted though that it is envisaged that an axle seating portion with three engagement areas at the corners of the rectangular axle body could also be applied to rigid trailing arms. As a skilled person will be aware of a rigid trailing arm does not have a front spring portion, but a rigid front portion with an eyelet in which a resilient bushing is arranged, that provides the necessary resiliency in the structure to absorb roll movements of the vehicle.

Also, in the above it is described that the axle body engages directly the surface of the axle seating portion of the trailing arm. It is however also possible to use an intermediate part that is located between the axle body and the trailing arm. The intermediate part may for example include three engagement areas for the axle body. Another option is that the intermediate part includes two engagement areas and a third engagement area is provided by the trailing arm. More in particular it is conceivable for example that as an intermediate part an axle pad is arranged between the upper side of the axle body and the longitudinal portion of the axle seating portion of the trailing arm, whereas the axle body engages directly an engagement area of the downwardly extending portion of the trailing arm. Also other configurations are conceivable, for example wherein an intermediate part provides only one engagement area, or where an intermediate part is arranged at the downwardly extending portion of the axle seating portion of the trailing arm.

BRIEF DESCRIPTION OF THE FIGURES

The invention will be elucidated in the following detailed description with reference to the drawing, in which.

DETAILED DESCRIPTION

Figure 1:
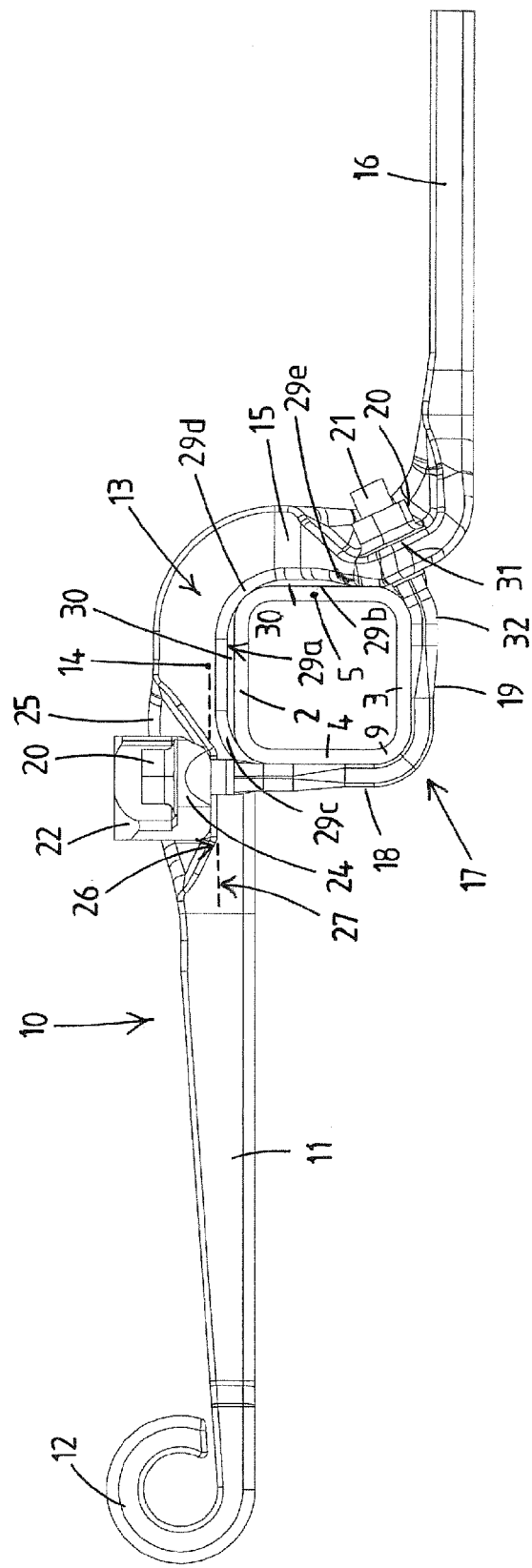
FIG. 1 shows a side elevational view of a wheel axle suspension according to the invention.
Figure 2:
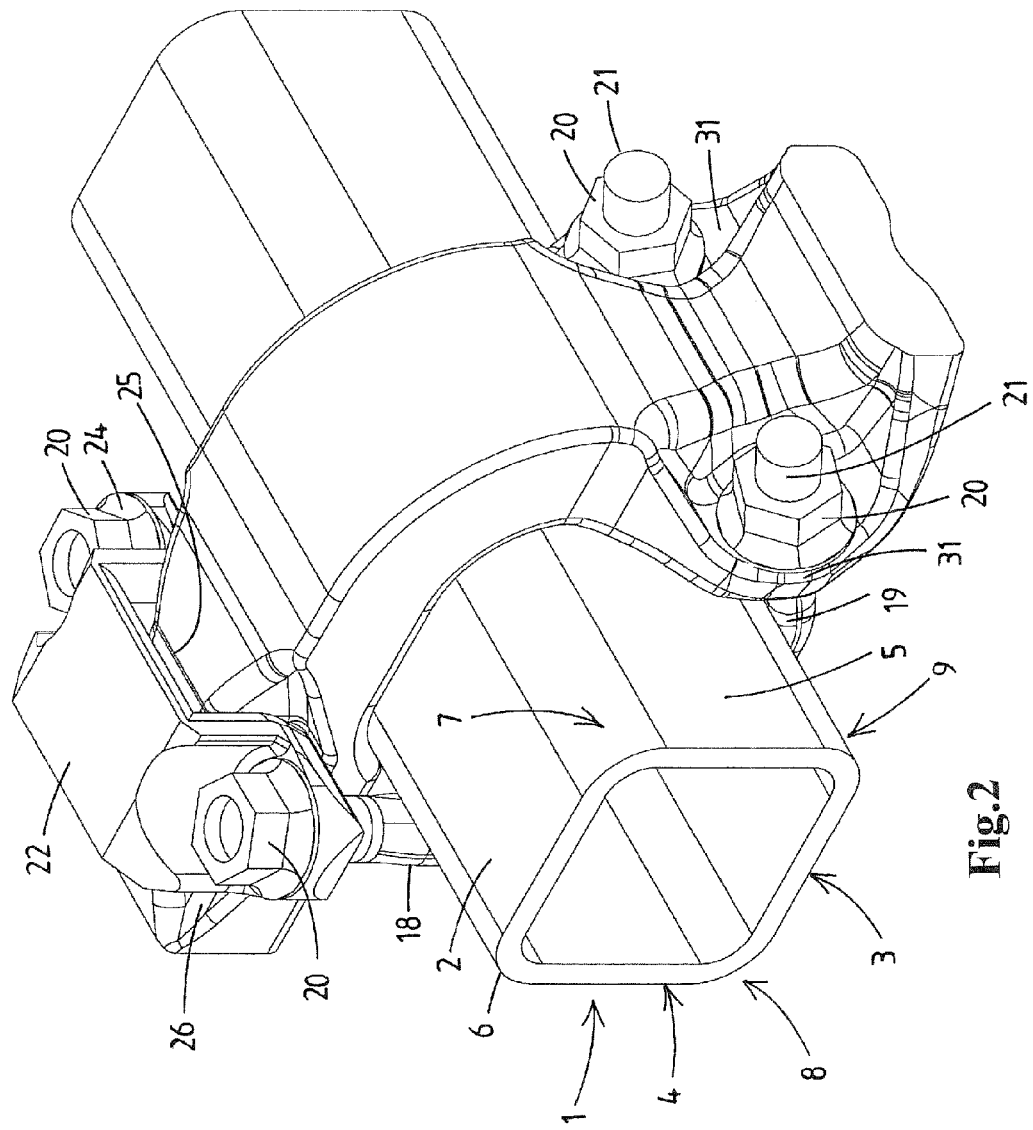
FIG. 2 shows a view in perspective of the clamping region of the wheel axle suspension of FIG. 1.

In FIGS. 1 and 2 is shown a part of a wheel axle suspension according to the invention.

The wheel axle suspension comprises a thin-walled tubular axle body 1 with a substantially square cross section. The axle body 1 has an upper side 2, an underside 3, a front side 4 and a rear side 5, as is indicated in FIG. 2. The axle body 1 furthermore has a front upper corner 6, a rear upper corner 7, a front lower corner 8 and a rear lower corner 9.

The wheel axle suspension furthermore comprises a flexible trailing arm 10. The trailing arm extends in a generally longitudinal direction of the vehicle.

The trailing arm 10 has a front spring portion 11. At a front end of the front spring portion 11 an eyelet 12 is formed. The eyelet 12 is used to pass a hinge bolt (not shown) through in order to hingedly attach the trailing arm 10 to a bearing bracket (not shown) of a vehicle chassis.

The trailing arm 10 furthermore has an axle seating portion 13 at a rear end of the front spring portion. The axle seating portion 13 has a longitudinal portion 14 that adjoins the front spring portion 11 and is essentially in line therewith. Furthermore the axle seating portion 13 has a downwardly extending portion 15 extending substantially perpendicular to the longitudinal portion 14.

At the lower end of the downwardly extending portion 15 a support arm 16 for an air spring adjoins the downwardly extending portion 15. The support arm 16 extends in a longitudinal direction towards the rear. The air spring (not shown) will be mounted between the support arm 16 and a vehicle chassis (not shown) located above the trailing arm 10.

The axle body 1 extends transversely, substantially perpendicular to the trailing arm 10. The square axle body 1 is received in the generally L-shaped axle seating portion 13, wherein the upper side 2 of the axle body 1 is facing the longitudinal portion 14 of the axle seating portion 13, and wherein the rear side 5 of the axle body 1 is facing the downwardly extending portion 15 of the trailing arm 10.

On either side of the trailing arm 10 a clamping strap 17 is arranged around the underside 3 and the front side 4 of the axle body 1. The clamping strap 17 has an upwardly extending leg 18 that extends along the front side 4 of the axle body 1 and a rearwardly extending leg 19 that extends along the underside of the axle body 3. The upwardly extending leg 18 has an end portion provided with a male thread that cooperates with a nut 20. Also the rearwardly extending leg 19 has an end portion 21 provided with a male thread that cooperates with a nut 20. With the nuts 20 the strap 17 can be tightened around the axle body 1.

At the front end of the axle seating portion 13 a strap plate 22 is arranged. The strap plate 22 is in the embodiment shown a bracket with generally a U-shape and with outwardly extending wings 24 at the ends of the legs of the U. The wings 24 are each provided with a bore for passing through the end portion of the front strap leg 18. The U-shaped bracket interconnects the wings 24 as a bridge part.

Figure 3:
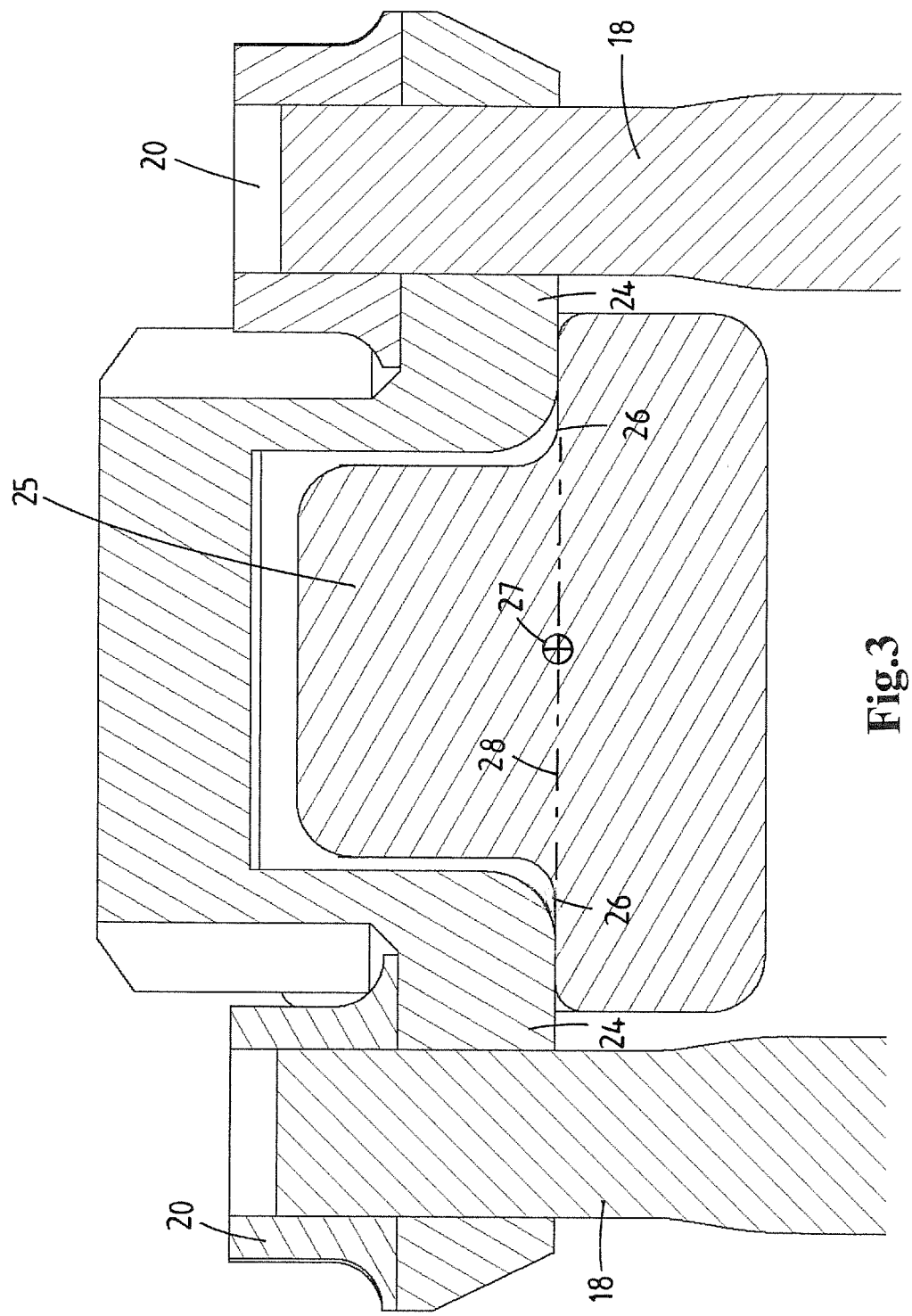
FIG. 3 shows a cross section through the clamping region of FIG. 2 at the location of front strap legs.

The trailing arm 10 has at the location of the strap plate 22 a thickened back portion 25 flanked on either side by a recessed support surface 26. The recessed support surfaces 26 support the wings 24. The bridge portion of the U-shaped bracket extends over the back portion 25 of the trailing arm, but does not rest on it. There is a spacing between the bridge portion of the strap plate 22 and said back portion 25 of the trailing arm 10. Consequently the strap plate 22 is only supported at its wings 24 by the recessed support surfaces 26. It is preferred to form the recessed support surfaces 26 in the same plane 28 as the neutral line 27 of the trailing arm as is shown in FIGS. 1 and 3. The neutral line 27 is the line at which the trailing arm is not compressed or stretched when the trailing arm 10 is bending. By supporting the wings 24 of the strap plate 22, at the neutral line 27, the strap plate 22 and the straps 17 associated therewith will be subjected to movements and thus dynamic loads to a minimal extent when the trailing arm 10 is bending during normal operation of the vehicle. It is noted here that this aspect of the invention is not limited to the specific suspension for square axle bodies shown herein. Also other trailing arm designs, for example suitable for round axle bodies, can make use of this aspect. Even trailing arm designs where the axle body is seated in an axle pad located between the axle body and the trailing arm, can make use of this aspect of the invention.

The thickened back portion 25 of the trailing arm 10 at the location of the strap plate 22 provides further rigidity to the trailing arm at the clamping region. Thereby the deformation and dynamic loads at the clamping region is further reduced.

The downwardly extending portion 15 of the axle seating portion 13 is provided at its lower end with recessed ears 31 at either side of the trailing arm 10. These ears 31 are provided with bores for passing through the end portions 21 of the rear legs 19 of the straps 17. The surface of the ears 31 at which the nuts 20 engage is inclined an is facing towards the rear and upward. The end portion 21 of the rear strap leg 19 is inclined with respect to the rest of said leg 19 that extends along the underside of the axle body. The end portion 21 is bent upwards with respect of the remainder of the rearwardly extending leg 19 and extends through the bore in the ear 31. The bend 32 is located at the lower rear corner 9 of the axle body 1. By this the axle body 1 is locked in the seating portion 13 when the strap 17 is tightened.

The ears 31 provide a wider basis at the lower end of the downwardly extending portion 15. This provides a more stable structure to resist forces for example coming from the air spring. For example an air spring that is mounted on the support arm 16 in an offset position with respect to the longitudinal axis of the trailing arm, may cause torsional loads in the support arm 16, which can be resisted better by the wider base provided at the transition between the air spring support arm 16 and the lower end of the downwardly extending portion of the axle seating portion 13.

The axle seating portion 13 of the trailing arm 10 has an axle body facing surface 29 which includes a longitudinal surface portion 29a and a downwardly extending surface portion 29b on the longitudinal portion 14 and downwardly extending portion 15 of the axle seating portion 13 respectively.

The axle body facing surface 29 includes furthermore a rear corner 29d that is between the portions 29a and 29b, and a front corner 29c at the front end of the surface portion 29a.

At the lower end of the surface portion 29b a projecting portion 29e. The front and rear surface corners 29c and 29d are concave, the projecting portion 29e is convexly shaped.

The corners 29c, 29d and the projecting portion 29e constitute engagement areas of the axle seating portion 13 of the trailing arm 10. The axle body 1 engages the axle seating portion 13 at these areas 29c, 29d and 29e. In the surface portions 29a and 29b are in the mounted state of the axle body 1 spaced apart from the upper side and the rear side of the axle body as can be seen clearly in FIG. 1. In other words, there is a clearance 30 between the axle body 1 and the axle body facing surface 29 in the regions between the engagement areas 29c, 29d and 29e.

Figure 4:
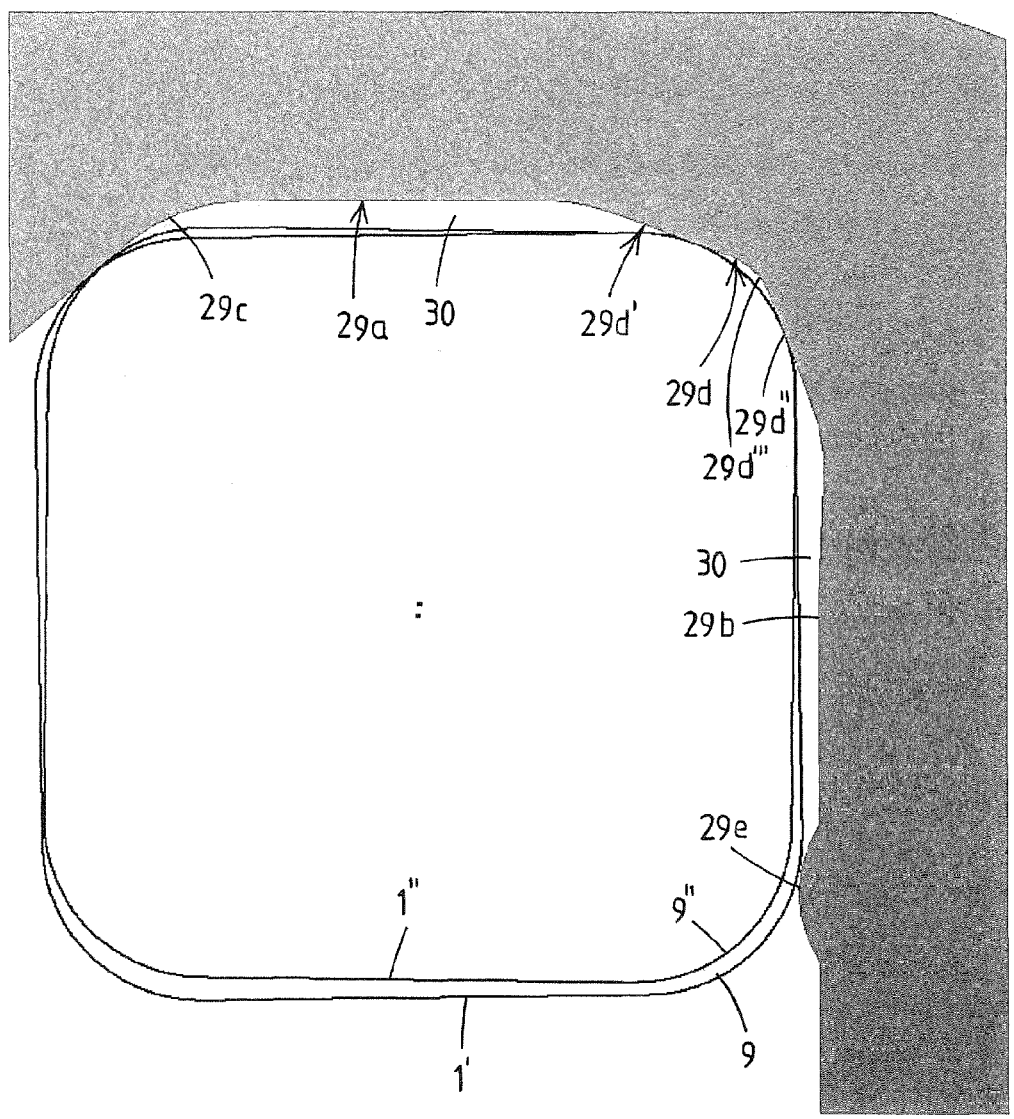
FIG. 4 shows schematically a side view of a square axle body seated in a possible embodiment of an axle seating portion of a trailing arm according to the invention.
Figure 5:
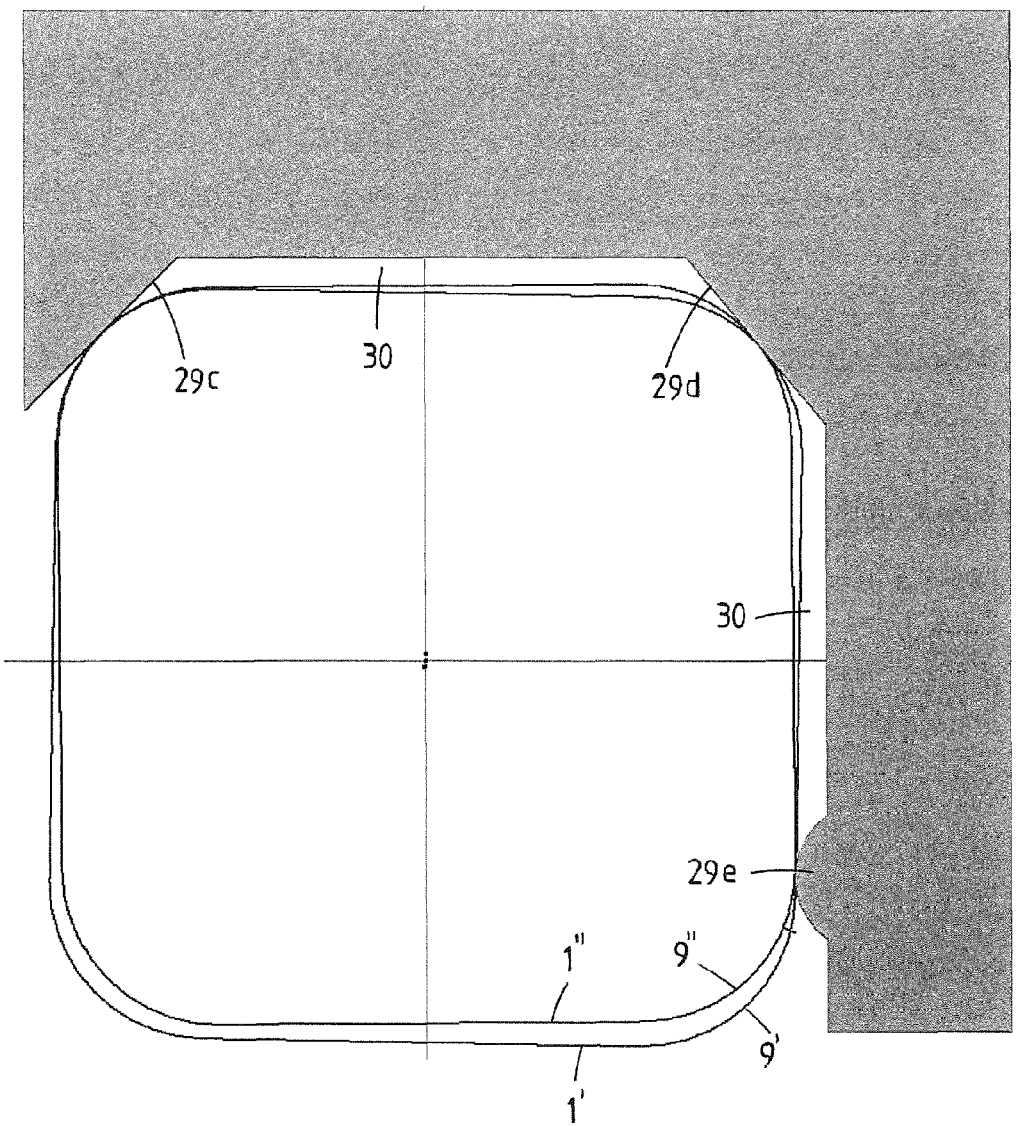
FIG. 5 shows schematically a side view of a square axle body seated in another embodiment of an axle seating portion of a trailing arm according to the invention.

The three engagement areas 29c, 29d and 29e provide three bearing points for the axle body 1 and the axle body 1 will always find a stable seating against the three bearing points independently of the exact shape and size of the substantially square axle body 1. Thus axle bodies with a slightly different shape or size can be arranged in the axle seating portion 13 whilst guaranteeing a stable bearing in the axle seating portion 13 of the trailing arm 10. This is illustrated in FIGS. 4 and 5 in which each time is depicted a first axle body 1' and a second axle body 1" which has a slightly smaller dimension than the first axle body 1'. This also overcomes the problem of tolerance differences that may occur in the axle bodies and/or trailing arms. The clearance 30 between the upper side and rear side of the axle body 1, 1', 1" may be larger or smaller, depending on the specific axle body dimension relative to the dimensions of the axle seating portion 13.

In FIG. 1 the wheel axle suspension is shown in a state with tightened clamping straps 17. In this particular embodiment there is a relatively large clearance 30 remaining between the surface portions 29a and 29b of the axle seating portion 13 on the one hand and the upper side 2 and the rear side 5 of the axle body respectively on the other hand. There are however also embodiments in which there is a clearance 30 present between the mentioned axle body sides 2 and 5 and the surface portions 29a and 29b of the axle body seating portion 13 when the straps 17 are not tightened (see for example FIGS. 4 and 5), but wherein the clearance becomes very small (e.g. 0.1 mm) or even disappears due to slight deformation of the axle body 1 when the straps 17 are tightened. In the light of the invention it is important that the clearance 30 is there initially and the axle facing surface portions 29a and 29b do not engage the entire upper side 2 and rear side 5 of the axle body 1 in the untensioned state of the clamping straps 17, because it was found that that would lead to an undesirably large deformation of the axle body 1.

As can be seen in FIG. 4 the second axle body 1" in an untensioned state will only engage the engagement areas 29c and 29d. However, by tensioning the straps 17, the axle seating portion 13 will deform and move the engagement area 29e towards the axle body 1".

In FIG. 4 is shown the possible embodiment in which the engagement area 29d is segmented and has essentially two flat contact surfaces 29d' and 29d" separated by an angle 29d'". The flat contact surfaces 29d' and 29d" have a different inclination with respect to the longitudinal direction of the trailing arm 10.

In FIG. 5 an embodiment of the axle seating portion 13 is shown in which the upper engagement areas 29c and 29d comprise an essentially flat contact surface.

The lower contact surface 29e engages the axle body 1, 1', 1" just above the rear lower corner 9, 9', 9" (FIGS. 1 and 5) or at the rear lower corner 9', 9" (FIG. 4) thereof.

The invention claimed is:

1. A wheel axle suspension of a vehicle, comprising:
an axle body having a rectangular cross section, a front side, a rear side, an upper side, an underside, an upper front corner, an upper rear corner, a lower front corner and a lower rear corner;
a flexible trailing arm extending in a longitudinal direction of the vehicle and crossing the axle body substantially perpendicular, the trailing arm having a front spring portion extending in the longitudinal direction of the vehicle and provided with an eyelet formed at a front end and an axle seating portion adjoining the front spring portion at a rear end of the front spring portion, the axle seating portion comprising a longitudinal portion extending substantially in line with the front spring portion, and a downwardly extending portion adjoining the longitudinal portion at a rear end thereof, wherein the downwardly extending portion extends substantially perpendicular to the longitudinal portion, and wherein the axle body is received in the axle seating portion with the upper side and rear side facing the longitudinal portion and the downwardly extending portion respectively; and
at least one clamping strap for clamping the axle body and the trailing arm together,
wherein the axle seating portion of the trailing arm has an axle body facing surface having three engagement areas engaging the axle body respectively at the front upper corner, the rear upper corner and at a region at or adjacent the lower rear corner of the axle body,
wherein in an untensioned state of the clamping strap between at least two of said engagement areas there is clearance between the axle body facing surface of the axle seating portion and the upper side and rear side of the axle body,
wherein the clamping strap has an upwardly extending leg that extends along the front side of the axle body and a rearwardly extending leg that extends along the underside of the axle body,
wherein the upwardly extending leg of the strap is supported at a front end of the axle seating portion of the trailing arm, and wherein the rearwardly extending leg of the strap is supported at a rear end of the axle seating portion, and
wherein a strap plate is provided at the front end of the axle seating portion of the trailing arm, which strap plate extends in transverse direction over an upper side of the trailing arm and has on either side a bore, one of which is configured to receive the upwardly extending leg of the strap.

2. The wheel axle suspension according to claim 1, wherein at least one of an upper two of said engagement areas has a contact surface with a concave shape.

3. The wheel axle suspension according to claim 1, wherein at least one of an upper two of said engagement areas has a substantially flat contact surface.

4. The wheel axle suspension according to claim 1, wherein the rear upper corner engagement area is segmented in two substantially flat contact surfaces having a different inclination with respect to a longitudinal direction of the arm.

5. The wheel axle suspension according to claim 1, wherein the lower rear corner engagement area comprises a generally concavely shaped contact surface that engages the axle body just above the lower rear corner thereof.

6. The wheel axle suspension according to claim 1, wherein the downwardly extending portion of the axle seating portion of the trailing arm is at a lower end provided with a bore for a rearwardly extending leg of the strap.

7. The wheel axle suspension according to claim 1, wherein an end portion of the rearwardly extending leg is bent upwards with respect of a remainder of the rearwardly extending leg that extends along the underside of the axle body.

8. The wheel axle suspension according to claim 1, wherein an end portion of the upwardly extending leg of the strap is bent rearwards with respect of a remainder of the upwardly extending leg that extends along the front side of the axle body.

9. The wheel axle suspension according to claim 1, wherein an end portion of the rearwardly extending leg of the strap is provided with a male thread, which cooperates with a nut for tightening the strap with respect to the trailing arm.

10. The wheel axle suspension according to claim 1, wherein an end portion of the upwardly extending leg of the strap is provided with a male thread, which cooperates with a nut for tightening the strap with respect to the trailing arm.

11. The wheel axle suspension according to claim 1, wherein the strap plate has on either side a wing which is provided with the bore for the upwardly extending leg of the strap, and wherein the strap plate has a bridge portion that interconnects the wings of the strap plate.

12. The wheel axle suspension according to claim 11, wherein the trailing arm has in its upper side at the front of the axle seating portion at either side a recessed area, which recessed areas form a support surface for the wings of the strap plate.

13. The wheel axle suspension according to claim 12, wherein the strap plate is only supported at its wings.

14. The wheel axle suspension according to claim 12, wherein the support surface of the recessed areas is located in a plane in which or near which a neutral axis of the trailing arm extends.

15. The wheel axle suspension according to claim 12, wherein the trailing arm between the two recessed areas has a back portion with a greater height or thickness than a remainder of the trailing arm.

16. The wheel axle suspension according to claim 1, wherein the trailing arm furthermore comprises an air spring mounting portion that adjoins the axle seating portion at a lower end of the downwardly extending portion thereof, and that extends further rearwardly.

17. A flexible trailing arm for a wheel axle suspension of a utility vehicle having a front spring portion extending in a longitudinal direction of the vehicle and provided with an eyelet formed at a front end and an axle seating portion adjoining the front spring portion at a rear end of the front spring portion, the axle seating portion comprising a longitudinal portion extending substantially in line with the front spring portion, and a downwardly extending portion adjoining the longitudinal portion at a rear end thereof, wherein the downwardly extending portion extends substantially perpendicular to the longitudinal portion, and wherein an axle body with a rectangular, preferably substantially square, cross section can be arranged in a right angle portion formed by the longitudinal portion and the downwardly extending portion,
wherein the axle seating portion of the trailing arm has an axle body facing surface having three engagement areas for engaging in use the axle body respectively at a front upper corner, a rear upper corner and at a region at or adjacent a lower rear corner of the axle body, wherein between at least two of said engagement areas there is a recessed area in the axle body facing surface which lies recessed from the engagement areas with respect to the axle body side such that, when the axle body is arranged in the right angle portion, a clearance is present between the recessed areas and a corresponding side or sides of the axle body.

18. The trailing arm according to claim 17, wherein the trailing arm at the longitudinal portion of the axle seating portion has a bending stiffness that is considerably higher than a bending stiffness of the spring portion of the trailing arm.

19. A wheel axle suspension of a vehicle, comprising:
an axle body having a rectangular cross section, a front side, a rear side, an upper side, an underside, an upper front corner, an upper rear corner, a lower front corner and a lower rear corner;
a flexible trailing arm extending in a longitudinal direction of the vehicle and crossing the axle body, the trailing arm having a front spring portion extending in the longitudinal direction of the vehicle and provided with an eyelet formed at a front end and an axle seating portion adjoining the front spring portion at a rear end of the front spring portion, the axle seating portion comprising a longitudinal portion extending substantially in line with the front spring portion, and a downwardly extending portion adjoining the longitudinal portion at a rear end thereof, wherein the downwardly extending portion extends substantially perpendicular to the longitudinal portion, and wherein the axle body is received in the axle seating portion with the upper side and rear side facing the longitudinal portion and the downwardly extending portion respectively;
clamping straps that clamp the axle body and the trailing arm together;
wherein the axle seating portion of the trailing arm has an axle body facing surface having three engagement areas engaging the axle body respectively at the front upper corner, the rear upper corner and at a region at or adjacent the lower rear corner of the axle body and in an untensioned state of the clamping straps between at least two of said engagement areas there is clearance between the axle body facing surface of the axle seating portion and the upper side and rear side of the axle body;
wherein the clamping straps each have an upwardly extending leg that extends along the front side of the axle body and a rearwardly extending leg that extends along the underside of the axle body, the upwardly extending leg of at least one of the clamping straps being supported at a front end of the axle seating portion of the trailing arm and the rearwardly extending leg of the at least one of the clamping straps is supported at a rear end of the axle seating portion; and
wherein a strap plate is provided at the front end of the axle seating portion of the trailing arm, which strap plate extends in a transverse direction over an upper side of the trailing arm and has on either side a bore through which the upwardly extending leg of a corresponding one of the clamping straps passes, and the downwardly extending portion of the axle seating portion of the trailing arm is at its lower end provided with a bore through which the rearwardly extending leg of one of the clamping straps passes.

20. A wheel axle suspension of a vehicle, comprising:
an axle body;
a flexible trailing arm extending in a longitudinal direction of the vehicle and crossing the axle body, the trailing arm having a front spring portion extending in the longitudinal direction of the vehicle and provided with an eyelet formed at a front end and an axle seating portion adjoining the front spring portion at a rear end of the front spring portion, wherein the axle body is received in the axle seating portion;
clamping straps that clamp the axle body and the trailing arm together;
wherein the clamping straps each have an upwardly extending leg that extends along a front side of the axle body and a rearwardly extending leg that extends along an underside of the axle body, the upwardly extending leg of the clamping strap being supported at a front end of the axle seating portion of the trailing arm and the rearwardly extending leg of the strap is supported at a rear end of the axle seating portion; and
wherein a strap plate is provided at the front end of the axle seating portion of the trailing arm, which strap plate extends in a transverse direction over an upper side of the trailing arm and has on either side a bore through which the upwardly extending leg of a corresponding one of the clamping straps passes, and a downwardly extending portion of the axle seating portion of the trailing arm is at a lower end provided with a bore through which the rearwardly extending leg of one of the clamping straps passes.

21. A wheel axle suspension of a vehicle, comprising:
an axle body having a rectangular cross section, a front side, a rear side, an upper side, an underside, an upper front corner, an upper rear corner, a lower front corner and a lower rear corner;
a flexible trailing arm extending in a longitudinal direction of the vehicle and crossing the axle body substantially perpendicular, the trailing arm having a front spring portion extending in the longitudinal direction of the vehicle and provided with an eyelet formed at a front end and an axle seating portion adjoining the front spring portion at a rear end of the front spring portion, the axle seating portion comprising a longitudinal portion extending substantially in line with the front spring portion, and a downwardly extending portion adjoining the longitudinal portion at a rear end thereof, wherein the downwardly extending portion extends substantially perpendicular to the longitudinal portion, and wherein the axle body is received in the axle seating portion with the upper side and rear side facing the longitudinal portion and the downwardly extending portion respectively; and
at least one clamping strap for clamping the axle body and the trailing arm together,
wherein the axle seating portion of the trailing arm has an axle body facing surface having three engagement areas engaging the axle body respectively at the front upper corner, the rear upper corner and at a region at or adjacent the lower rear corner of the axle body,
wherein in an untensioned state of the clamping strap between at least two of said engagement areas there is clearance between the axle body facing surface of the axle seating portion and the upper side and rear side of the axle body,
wherein the clamping strap has an upwardly extending leg that extends along the front side of the axle body and a rearwardly extending leg that extends along the underside of the axle body,
wherein the upwardly extending leg of the strap is supported at a front end of the axle seating portion of the trailing arm, and wherein the rearwardly extending leg of the strap is supported at a rear end of the axle seating portion, and
wherein an end portion of the rearwardly extending leg is bent upwards with respect of a remainder of the rearwardly extending leg that extends along the underside of the axle body.

* * * * *